(12) United States Patent
Zhang et al.

(10) Patent No.: US 12,260,836 B2
(45) Date of Patent: Mar. 25, 2025

(54) PIXEL CIRCUIT, METHOD FOR CONTROLLING PIXEL AND DISPLAY DEVICE

(71) Applicant: HKC CORPORATION LIMITED, Shenzhen (CN)

(72) Inventors: Guangchen Zhang, Shenzhen (CN); Tingting Shen, Shenzhen (CN); Li Lv, Shenzhen (CN); Yunyang Liu, Shenzhen (CN); Zhiwei Li, Shenzhen (CN); Jie Wang, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/365,871

(22) Filed: Aug. 4, 2023

(65) Prior Publication Data
US 2024/0221699 A1     Jul. 4, 2024

(30) Foreign Application Priority Data
Dec. 28, 2022    (CN) .......................... 202211688066.5

(51) Int. Cl.
    *G09G 3/36*       (2006.01)
    *G02F 1/1362*      (2006.01)
    *G02F 1/1368*      (2006.01)

(52) U.S. Cl.
CPC ..... *G09G 3/3614* (2013.01); *G02F 1/136286* (2013.01); *G02F 1/1368* (2013.01);
(Continued)

(58) Field of Classification Search
CPC ... G02F 1/136286; G02F 1/1368; G09G 3/36; G09G 3/3614; G09G 3/3648;
(Continued)

(56) References Cited

U.S. PATENT DOCUMENTS

2008/0239182 A1    10/2008    Huang et al.
2013/0222724 A1    8/2013    Ueda et al.
(Continued)

FOREIGN PATENT DOCUMENTS

CN          1702720 A     11/2005
CN        101281309 A     10/2008
(Continued)

OTHER PUBLICATIONS

First Office Action issued in counterpart Chinese Patent Application No. 202211688066.5, dated Feb. 3, 2023.
(Continued)

*Primary Examiner* — Robin J Mishler
*Assistant Examiner* — Cory A Almeida
(74) *Attorney, Agent, or Firm* — Westbridge IP LLC (57) ABSTRACT

Disclosed are a pixel circuit, a method for controlling a pixel and a display panel. The pixel circuit includes a first thin film transistor, a controlled end of the first thin film transistor is connected to the scan line, and an input end of the first thin film transistor is connected to the data line; and a first selection circuit, an input end of the first selection circuit is connected to an output end of the first thin film transistor, the first output end of the first selection circuit is connected to the first pixel electrode, and a second output end of the first selection circuit is connected to the second pixel electrode;
(Continued)

the first thin film transistor is configured to sequentially write a data signal transmitted on the data line into the first pixel and the second pixel through the first selection circuit.

5 Claims, 7 Drawing Sheets

(52) U.S. Cl.
CPC ......... *G09G 3/3648* (2013.01); *G09G 3/3655* (2013.01); *G09G 2300/0852* (2013.01); *G09G 2320/0233* (2013.01)

(58) Field of Classification Search
CPC ......... G09G 3/3655; G09G 2300/0852; G09G 2320/0233
See application file for complete search history.

(56) References Cited

U.S. PATENT DOCUMENTS

| 2017/0200412 A1* | 7/2017 | Gu ....................... G09G 3/3266 |
| 2020/0064701 A1 | 2/2020 | Nishiyama et al. |

FOREIGN PATENT DOCUMENTS

| CN | 101630099 A | 1/2010 |
| CN | 101762915 A | 6/2010 |
| CN | 108986763 A | 12/2018 |
| CN | 110136630 A | 8/2019 |
| CN | 114639348 A | 6/2022 |
| CN | 115394262 A | 11/2022 |
| CN | 115657353 A | 1/2023 |
| JP | 2012247731 A | 12/2012 |
| KR | 19990006221 A | 1/1999 |
| WO | 2022160164 A1 | 8/2022 |

OTHER PUBLICATIONS

Grant Notification issued in counterpart Chinese Patent Application No. 202211688066.5, dated Feb. 9, 2023.
International Search Report and Written Opinion issued in corresponding PCT Application No. PCT/CN2023/095354, dated Sep. 21, 2023.

* cited by examiner

FIG. 4 in a first sub-stage, outputting a high electric potential scan signal to an Nth row scan line, and outputting a positive-polarity preset electric potential data signal to the data line, so that the first pixel is charged to a corresponding pixel electric potential of a current frame — S100 in a second sub-stage, outputting the high electric potential scan signal to the Nth row scan line, and outputting a negative-polarity preset electric potential data signal to the data line, so that the second pixel is charged to the corresponding pixel electric potential of the current frame — S200

PIXEL CIRCUIT, METHOD FOR CONTROLLING PIXEL AND DISPLAY DEVICE

CROSS-REFERENCE TO RELATED APPLICATIONS

This application claims priority to Chinese Patent Application No. 202211688066.5, filed on Dec. 28, 2022, the entire contents of which are incorporated herein by reference.

TECHNICAL FIELD

The present application relates to the technical field of pixel control, and in particular to a pixel circuit, a method for controlling a pixel and a display panel.

BACKGROUND

Display brightness is an important parameter affecting the display quality of liquid crystal display devices, and the aperture ratio is the main factor determining the display brightness. The ratio of the effective area transmitted through, that is, the larger the aperture ratio, the higher the display brightness. However, due to the low aperture ratio of the existing liquid crystal display device, the display brightness is relatively low.

SUMMARY

The main objective of the present application is to provide a pixel circuit, which aims to solve a problem that a display brightness of the liquid crystal display device is low due to the low aperture ratio.

In order to achieve the above objective, the present application provides a pixel circuit, applied to a display panel, the display panel includes a scan line, a data line, a first pixel, and a second pixel, the first pixel including a first pixel electrode, and the second pixel including a second pixel electrode.

The pixel circuit includes a first thin film transistor, and a first selection circuit.

A controlled end of the first thin film transistor is connected to the scan line, and an input end of the first thin film transistor is connected to the data line.

An input end of the first selection circuit is connected to an output end of the first thin film transistor, the first output end of the first selection circuit is connected to the first pixel electrode, and a second output end of the first selection circuit is connected to the second pixel electrode.

The first thin film transistor is configured to sequentially write a data signal transmitted on the data line into the first pixel and the second pixel through the first selection circuit according to a scanning signal transmitted on the scan line, to charge the first pixel and the second pixel sequentially, so that the first pixel and the second pixel are sequentially charged to a corresponding pixel electric potential of a current frame.

In an embodiment, the first selection circuit includes a first unidirectional circuit, and a second unidirectional circuit.

A first end of the first unidirectional circuit is connected to the output end of the first thin film transistor, and a second end of the first unidirectional circuit is connected to the first pixel electrode.

A first end of the second unidirectional circuit is connected to the output end of the first thin film transistor, and a second end of the second unidirectional circuit is connected to the second pixel electrode.

In response to that the first thin film transistor outputs a data signal, one of the first unidirectional circuit or the second unidirectional circuit is conducted, the other of the first unidirectional circuit or the second unidirectional circuit is turned off, and a conducting current direction of the first unidirectional circuit is opposite to a conducting current direction of the second unidirectional circuit.

In an embodiment, the pixel circuit includes a reset circuit, a controlled end of the reset circuit is connected to a previous preset row scan line, an input end of the reset circuit is configured to access a preset reset electric potential, a first output end of the reset circuit is connected to the first pixel electrode, and a second output end of the reset circuit is connected to the second pixel electrode, and the reset circuit is configured to output the preset reset electric potential to the first pixel electrode and the second pixel electrode according to a scan signal transmitted on the previous preset row scan line, so as to reset the first pixel and the second pixel.

In an embodiment, the pixel circuit further includes a second selection circuit, a first input end of the second selection circuit is connected to the first output end of the reset circuit, a second input end of the second selection circuit is connected to the second output end of the reset circuit, a first output end of the second selection circuit is connected to the first pixel electrode, and a second output end of the second selection circuit is connected to the second pixel electrode.

In an embodiment, the second selection circuit includes a third unidirectional circuit, and a fourth unidirectional circuit.

A first end of the third unidirectional circuit is connected to the first pixel electrode, and a second end of the third unidirectional circuit is connected to the first output end of the reset circuit.

A first end of the fourth unidirectional circuit is connected to the second pixel electrode, and a second end of the fourth unidirectional circuit is connected to the second output end of the reset circuit.

In response to that the reset circuit is conducted, both the first unidirectional circuit and the second unidirectional circuit are conducted, and a conducting current direction of the third unidirectional circuit is the same as the conducting current direction of the first unidirectional circuit, and a conducting current direction of the fourth unidirectional circuit is the same as the conducting current direction of the second unidirectional circuit.

In an embodiment, the pixel circuit further includes a second thin film transistor, and a third thin film transistor.

A controlled end of the second thin film transistor is connected to the scan line, an input end of the second thin film transistor is configured to access the first preset electric potential, and an output end of the second thin film transistor is connected to the second end of the third unidirectional circuit.

A controlled end of the third thin film transistor is connected to the scan line, an input end of the third thin film transistor is configured to access the second preset electric potential, and an output end of the third thin film transistor is connected to the second end of the fourth unidirectional circuit.

In an embodiment, the first unidirectional circuit, the second unidirectional circuit, the third unidirectional circuit, and the fourth unidirectional circuit include PN junctions.

The present application further provides a method for controlling a pixel, applied to the above pixel circuit, the method includes:

in a first sub-stage, outputting a high electric potential scan signal to an Nth row scan line, and outputting a positive-polarity preset electric potential data signal to the data line, so that the first pixel is charged to a corresponding pixel electric potential of a current frame; and in a second sub-stage, outputting the high electric potential scan signal to the Nth row scan line, and outputting a negative-polarity preset electric potential data signal to the data line, so that the second pixel is charged to the corresponding pixel electric potential of the current frame.

In an embodiment, the method further includes:

in response to that conducting current directions of a first unidirectional circuit, a second unidirectional circuit, a third unidirectional circuit, and a fourth unidirectional circuit in two adjacent pixel circuits of a same row are the same, controlling a polarity of data signals transmitted on any two adjacent data lines to be opposite; or in response to that the conducting current directions of the first unidirectional circuit, the second unidirectional circuit, the third unidirectional circuit, and the fourth unidirectional circuit in two adjacent pixel circuits of a same row are opposite, controlling a polarity of the data signals transmitted on any two adjacent data lines to be same.

The present application further provides a display device, including: a scan line, a data line, a first pixel including a first pixel electrode, a second pixel including a second pixel electrode; and the above-mentioned pixel circuit.

The pixel circuit is respectively connected to the scan line, the data line, the first pixel electrode and the second pixel electrode, and the display device is configured to control the pixel circuit to drive the first pixel and the second pixel to work according to the above method for controlling the pixel.

The technical solution of the present application adopts the first thin film transistor and the first selection circuit, and the first thin film transistor is configured to sequentially write the data signal transmitted on the data line to the first pixel and the second pixel through the first selection circuit, so as to sequentially charge the first pixel and the second pixel, so that the first pixel and the second pixel may be sequentially charged to the corresponding pixel electric potential of the current frame. In this way, the pixel circuit of the present application only needs one scan line and one thin film transistor to realize the display control of the two pixels located on both sides of the scan line. As far as the liquid crystal display device is concerned, only 0.5n scan lines L1 and 0.5×m×n thin film transistors need to be provided in its effective display area, which greatly reduces the quantity of scan lines L1 provided in the effective display area compared with the related art. The quantity of lines L1 and the quantity of thin film transistors greatly increase the aperture ratio of the effective display area of the liquid crystal display device, thereby helping to improve the display brightness of the liquid crystal display device, thereby solving the problem of low display brightness caused by the low aperture ratio of the liquid crystal display device.

BRIEF DESCRIPTION OF THE DRAWINGS

In order to more clearly illustrate the technical solutions in the embodiments of the present application or related art, the following is a brief description of the drawings for the description of the embodiments or related art, it is obvious that the drawings in the following description are only some of the embodiments of the present application, other structures can be obtained by those skilled in the art according to structures in these drawings without creative works.

The realization of the purpose, functional features and advantages of the present application will be further illustrated with reference to the drawings in conjunction with the embodiments.

DETAILED DESCRIPTION OF THE EMBODIMENTS

The technical solutions in the embodiments of the present application will be clearly and completely described below in conjunction with the drawings in the embodiments of the present application, and it is clear that the described embodiments are only some of the embodiments of the present application, and not all of them. Based on the embodiments in the present application, all other embodiments obtained by those skilled in the art fall within the scope of the present application without creative labor.

In addition, the descriptions such as "first" and "second" in the present application are for descriptive purposes only and are not to be construed as indicating or implying their relative importance or implicitly specifying the quantity of technical features indicated. Thus, the features defined with "first" and "second" may explicitly or implicitly include at least one such feature. In addition, the technical solutions of each embodiment can be combined with each other, but only on the basis that they can be achieved by those skilled in the art, when the combination of technical solutions appear to contradict each other or cannot be achieved, it should be considered that this combination of technical solutions does not exist, and is not within the scope of the present application.

First Embodiment

The present application provides a pixel circuit that may be applied to a liquid crystal display panel.

In the effective display area of the display panel, a plurality of scan lines L1 and a plurality of data lines L2 may be alternately provided to form a plurality of pixel intervals provided in a matrix, and one pixel is form in each pixel interval. The first pixel PXL1 may include a first pixel electrode S1, and the first pixel electrode S1 with the common electrode line may form a pixel capacitor and a storage capacitor in the first pixel PXL1 (referred to as the first pixel capacitor Ccl1 and the first storage capacitor Cst1 in the following description). The second pixel PXL2 may include a second pixel electrode S2, and the second pixel electrode S2 may form a pixel capacitor and a storage capacitor in the second pixel PXL2 (referred to as the second pixel capacitor and the second storage capacitor Cs in the following description) with a common electrode line.

In an exemplary technology, each pixel interval needs to be provided with one pixel circuit, and the pixel circuits in the same row of pixel intervals need to be connected to the same scan line L1, and each pixel circuit is provided with at least one thin film transistor, thus, as for a liquid crystal display device with a resolution of m×n, n scan lines L1 and at least m×n thin film transistors need to be provided in the effective display area, resulting in a low aperture ratio of the liquid crystal display device, thereby causing the display brightness of the liquid crystal display device is low.

Figure 1:
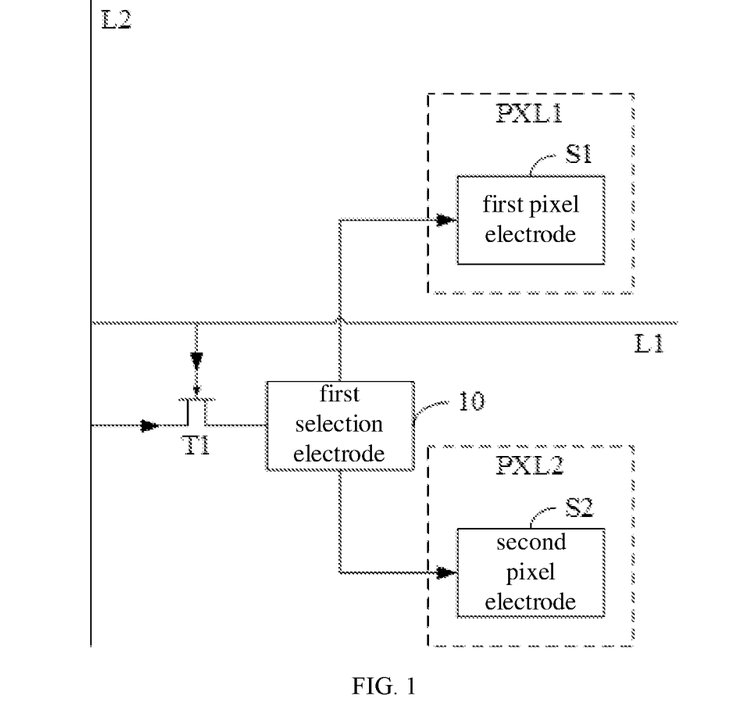
FIG. 1 is a schematic structural diagram of a module of a pixel circuit according to a first embodiment of the present application.
Figure 2:
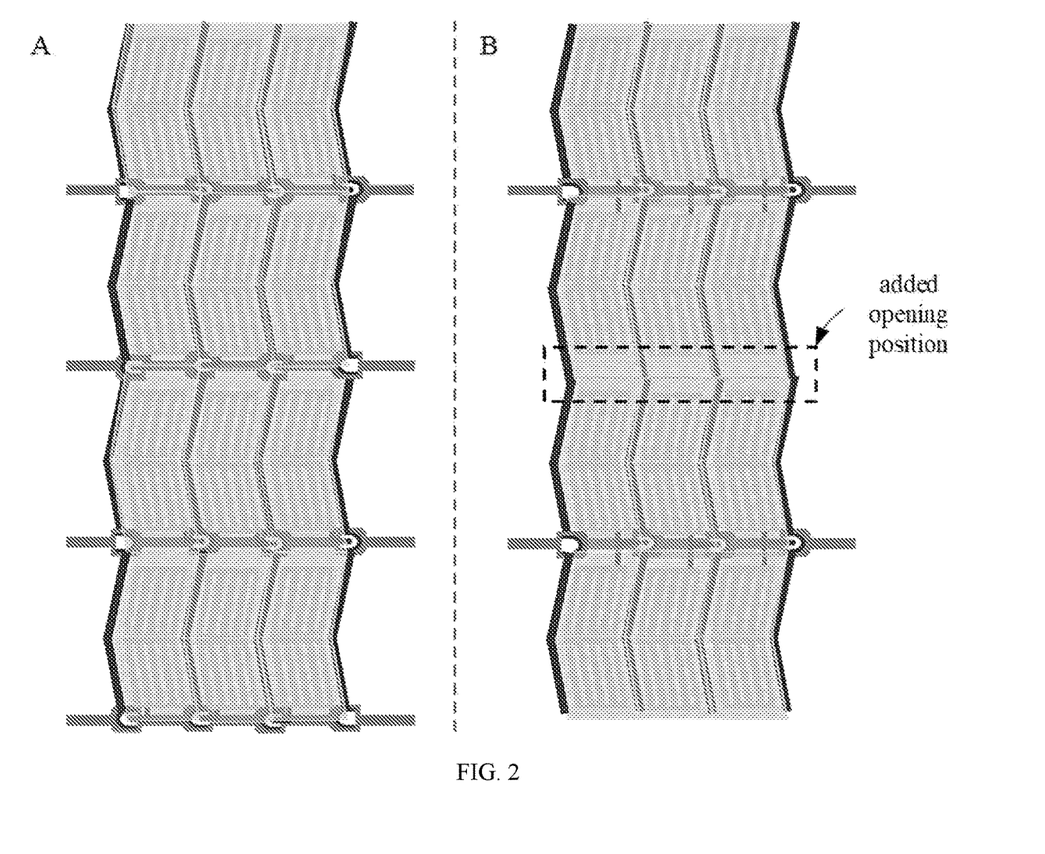
FIG. 2 is a schematic structural diagram of an added opening position of the pixel circuit according to the first embodiment of the present application.

In view of the above problems, as shown in FIG. 1 to FIG. 2, in the first embodiment, the pixel circuit includes a first thin film transistor T1, and a first selection circuit 10.

A controlled end of the first thin film transistor T1 is connected to the scan line L1, and the input end of the first thin film transistor T1 is connected to the data line L2.

An input end of the first selection circuit 10 is connected to the output end of the first thin film transistor T1, the first output end of the first selection circuit 10 is connected to the first pixel electrode S1, and the second output end of the first selection circuit 10 is connected to the second pixel electrode S2.

The first thin film transistor T1 is configured to sequentially write the data signal transmitted on the data line L2 into the first pixel PXL1 and the second pixel PXL1 through the first selection circuit 10 according to the scanning signal transmitted on the scan line L1, to charge the first pixel PXL1 and the second pixel PXL2 sequentially, so that the first pixel PXL1 and the second pixel PXL2 may be sequentially charged to the corresponding pixel electric potential of the current frame.

In this embodiment, the first thin film transistor T1 may be realized by using an N-type or P-type thin film transistor. The following description takes the first thin film transistor T1 as an N-type thin film transistor as an example to explain the technical solution of the present application. The controlled end, the input end, and the output end of the first thin film transistor T1 may be respectively the grid electrode, drain electrode, and source electrode of the N-type thin film transistor, and the first thin film transistor T1 may be conducted when receiving a high electric potential scanning signal, and when it is conducted, the data signal transmitted on the data line L2 may be connected and output to the first selection circuit 10.

The first selection circuit 10 may include a plurality of unidirectional circuits, each unidirectional circuit may include two ends, each unidirectional circuit may be conducted when the electric potential of one end is greater than the electric potential of the other end, the direction of the current is from one end with high electric potential to the other end with lower electric potential, and when the electric potential of the other end is greater than that of one end, the unidirectional circuit will not conduct, that is, each unidirectional circuit has a unidirectional conduction characteristic. The first selection circuit 10 may make the corresponding unidirectional circuit conduct in different sub-stages of the display control stage according to the electric potential of the data signal output by the first thin film transistor T1, so that the first pixel electrode S1 and the second pixel electrode S2 may successively access data signals at corresponding electric potentials through the corresponding unidirectional circuits in different sub-stages of the display control stage, and make the first pixel capacitor Ccl1 and the first storage capacitor Cst1, the second pixel capacitor and the second storage capacitor Cs may use the accessed data signal to correspondingly charge the pixel potential to the potential value required for the display of the current frame, that is, the pixel potential of the current frame, so that the first pixel PXL1 and the second pixel PXL2 may respectively control the inversion degree of the liquid crystal molecules at the corresponding pixel potentials of the current frame in the display stage, thereby realizing the on-display of the first pixel PXL1 and the second pixel PXL2 in the current frame picture.

In this way, the pixel circuit of this application only needs one scan line L1 and one first thin film transistor T1 to realize the display control of the two pixels (PXL1 and PXL2) located on both sides of the scan line L1. Therefore, in terms of the pixel circuit adopted in this application, and the liquid crystal display device with the resolution of m×n, only 0.5n scan lines L1 and 0.5×m×n thin film transistors need to be provided in its effective display area. Compared with the related art, the quantity of the scan lines L1 and the quantity of the thin film transistors provided in the effective display area are greatly reduced, and the aperture ratio of the effective display area of the liquid crystal display device is greatly improved. When the first pixel PXL1 and the second pixel PXL2 are in the same column and on opposite sides of the same scan line L1, the added opening position may be specifically shown in FIG. 2. Therefore, it is conducive for improving the display brightness of the liquid crystal display device, thereby solving the problem of low display brightness due to the low aperture ratio of the liquid crystal display device.

Figure 3:
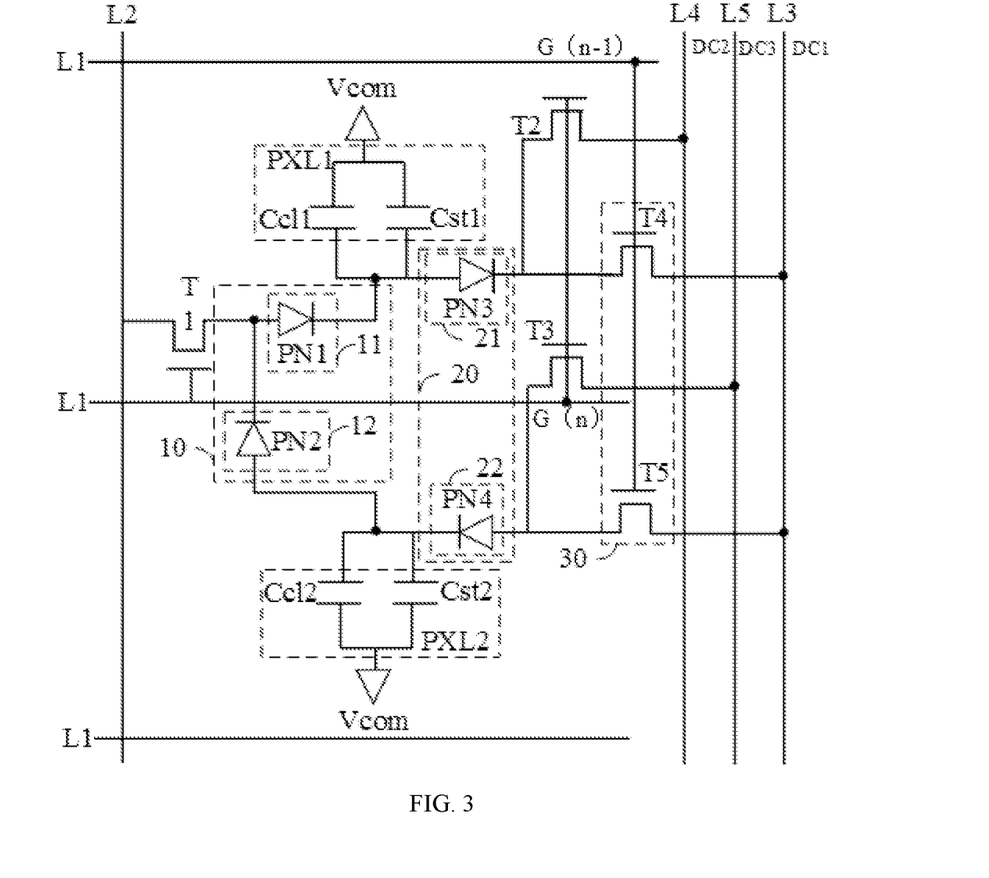
FIG. 3 is a schematic structural diagram of a circuit in the pixel circuit according to the first embodiment of the present application.

As shown in FIG. 2 to FIG. 3, in the first Embodiment, the first selection circuit 10 includes a first unidirectional circuit 11, and a second unidirectional circuit 12.

A first end of the first unidirectional circuit 11 is connected to the output end of the first thin film transistor T1, and a second end of the first unidirectional circuit 11 is connected to the first pixel electrode S1.

A first end of the second unidirectional circuit 12 is connected to the output end of the first thin film transistor T1, and a second end of the second unidirectional circuit 12 is connected to the second pixel electrode S2.

The first unidirectional circuit 11 and the second unidirectional circuit 12 may be implemented by adopting a PN junction, the first unidirectional circuit 11 may include a first PN junction PN1, and the second unidirectional circuit 12 may include a second PN junction PN2. Since the PN junction has a positive pole and a negative pole, the first selection circuit 10 may have two circuit structures according to the connection of the positive and negative poles of the PN junctions, specifically as follows.

The first circuit structure of the first selection circuit 10 is: as specifically shown in FIG. 3, the first end of the first unidirectional circuit 11 is the positive pole of the first PN junction PN1, and the second end of the first unidirectional circuit 11 may be the negative pole of the first PN junction PN1. The first end of the second unidirectional circuit 12 is the negative pole of the second PN junction PN2, and the second end of the second unidirectional circuit 12 may be the positive pole of the second PN junction PN2. In this way, when the first thin film transistor T1 outputs a high electric potential data signal, the first unidirectional circuit 11 is conducted, the second unidirectional circuit 12 is not conducted, and the current direction when the first unidirectional circuit 11 is conducted, that is, the direction of the conduction current is from the first end of the first unidirectional circuit 11 to the second end of the first unidirectional circuit 11, so as to write the high electric potential data signal into the first pixel PXL1 to charge the first pixel PXL1. When the first thin film transistor T1 outputs the low electric potential data signal, the first unidirectional circuit 11 is not conducted, the second unidirectional circuit 12 is conducted, and the current direction when the second unidirectional circuit 12 is conducted is from the second end to the first end, so as to realize writing the low electric potential data signal into the second pixel PXL2 to charge the second pixel PXL2.

Figure 4:
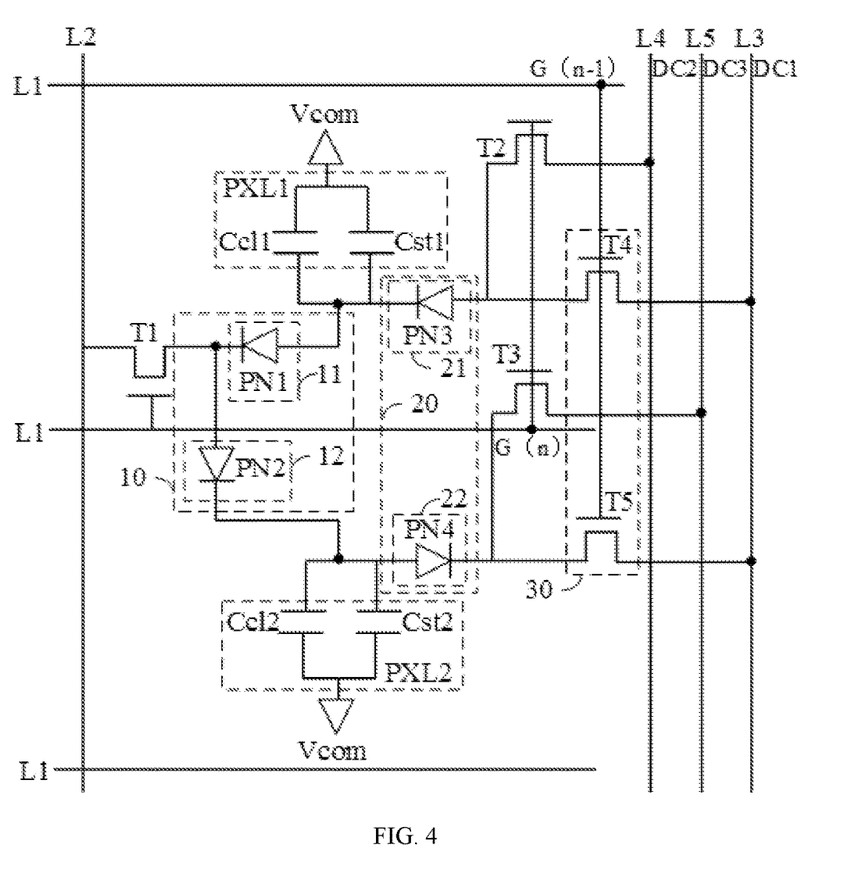
FIG. 4 is a schematic structural diagram of another circuit in the pixel circuit according to the first embodiment of the present application.

The second circuit structure of the first selection circuit 10 is: as specifically shown in FIG. 4, the first end of the first unidirectional circuit 11 is the negative pole of the first PN junction PN1, and the second end may be the positive pole of the first PN junction PN1, the first end of the second unidirectional circuit 12 is the positive pole of the second PN junction PN2, and the second end may be the negative pole of the second PN junction PN2. In this way, when the first thin film transistor T1 outputs a high electric potential data signal, the first unidirectional circuit 11 is not conducted, the second unidirectional circuit 12 is conducted, and the current direction when the second unidirectional circuit 12 is conducted is from the first end of the second unidirectional circuit 12 to the second end of the second unidirectional circuit 12, so as to write the high electric potential data signal into the second pixel PXL2 to charge the second pixel PXL2. When the first thin film transistor T1 outputs the low electric potential data signal, the first unidirectional circuit 11 is conducted, the second unidirectional circuit 12 is not conducted, and the current direction when the second unidirectional circuit 12 is conducted is from the second end to the first end, so as to write the low electric potential data signal into the first pixel PXL1, to charge the first pixel PXL1.

That is, when the first thin film transistor T1 outputs a data signal, the first unidirectional circuit 11 or the second unidirectional circuit 12 is conducted, the other is turned off, and the conduction current direction of the first unidirectional circuit 11 is opposite to the direction of the conduction current direction of the second unidirectional circuit 12.

In actual display, there is a display situation in which the pixel electric potential in the previous frame of the pixel is higher or lower than the pixel electric potential in the current frame of the pixel, and when this display situation occurs, it will affect the conduction situation of the first unidirectional circuit 11 or the second unidirectional circuit 12, thereby affecting the charging effect of the first pixel PXL1 or the second pixel PXL2 when displayed in the current frame. For example, when pixel electric potential in the previous frame of the pixel is higher than the pixel electric potential in the current frame of the pixel, when the first thin film transistor T1 outputs a high electric potential data signal, the high electric potential data signal is the low electric potential data signal relative to the previous frame of the pixel, the first unidirectional circuit 11 is not conducted, so the first pixel PXL1 may not be charged to the pixel electric potential of the current frame.

To solve this problem, the present application is provided with a reset circuit 30 in the pixel circuit, the controlled end of the reset circuit 30 is connected to the previous preset row scan line L1, the input end of the reset circuit 30 is configured to access the preset reset electric potential DC1, the first output end of the reset circuit 30 is connected to the first pixel electrode S1, and the first output end of the reset circuit 30 is connected to the second pixel electrode S2. The reset circuit 30 is configured to output the preset reset electric potential DC1 to the first pixel electrode S1 and the second pixel electrode S2 according to the scan signal transmitted on the previous preset row scan line L1, so as to reset the first pixel PXL1 and the second pixel electrode S2.

In this embodiment, the preset reset electric potential DC1 may be an intermediate electric potential between the high and low electric potentials of the first pixel PXL1 and the second pixel PXL2; the previous preset row scan lines L1 may be determined according to the actual reset need, for example: it may be the previous row scan lines L1 or the previous two rows scan lines L1, etc., which is not limited here. The reset circuit 30 may be realized by using a switch constructed by thin film transistors, the thin film transistors may be N-type or P-type thin film transistors, which are not limited here.

In the embodiment shown in FIG. 3 and FIG. 4, the reset circuit 30 may include a fourth thin film transistor T4 and a fifth thin film transistor T5, both of which are N-type thin film transistors, and the grid electrodes of the fourth thin film transistor T4 and the fifth thin film transistor T5 may be respectively connected to the previous preset row scan line L1, the drain electrodes of the fourth thin film transistor T4 and the fifth thin film transistor T5 may be respectively connected to the first potential line L3, the drain electrode of the fourth thin film transistor T4 may be connected to the first pixel electrode S1, the drain electrode of the fifth thin film transistor T5 is connected to the second pixel electrode S2. The first electric potential line L3 is configured to access and transmit the preset reset electric potential DC1. In this way, the reset circuit 30 may be conducted when a high electric potential scan signal is transmitted on the previous preset row scan line L1, and may output the preset reset electric potential DC1 to the first pixel electrode S1 and the second pixel electrode S2 when it is conducted, so that the electric potentials of the first pixel electrode S1 and the second pixel electrode S2 may be pulled down to the preset reset electric potential DC1, so as to realize the electric potential reset of the first pixel PXL1 and the second pixel PXL2. In addition, the present application adopts two thin film transistors to realize the electric potential reset of the first pixel PXL1 and the second pixel PXL2 respectively, compared with using a single thin film transistor to output the preset reset unit to two pixels simultaneously, it may avoid the charge sharing caused by the direct electrical connection between the first pixel electrode S1 and the second pixel electrode S2, which is beneficial to improve the display stability and display effect of the first pixel PXL1 and the second pixel PXL2.

Since the preset reset electric potential DC1 is low relative to the high electric potential of the data signal and is high relative to the low electric potential of the data signal, the first unidirectional circuit 11 and the second unidirectional circuit 11 may normally output data signals with different electric potentials from the first thin film transistor T1 to the first pixel electrode S1 and the second pixel electrode S2, so that the electric potentials of the first pixel PXL1 and the second pixel PXL2 may be charged to corresponding current frame pixel electric potential, which is beneficial to improve the display effect of the liquid crystal display device.

In actual use, there is a large off-state leakage current in the reset circuit 30, which easily affects the electric potentials of the first pixel electrode S1 and the second pixel electrode S2, thereby affecting the charging effect of the first pixel PXL1 and the second pixel PXL2 and the electric potential after charging.

To solve this problem, the present application is also provided with a second selection circuit 20 in the pixel circuit, the first input end of the second selection circuit 20 is connected to the first output end of the reset circuit 30, the second input end of the second selection circuit 20 is connected to the second output end of the reset circuit 30, the first output end of the second selection circuit 20 is connected to the first pixel electrode S1, and the second output end of the second selection circuit 20 is connected to the second pixel electrode S2. The first selection circuit 10 may also include a plurality of unidirectional circuits, and each unidirectional circuit may include at least one PN junction, so as to reduce the off-state current of the reset circuit 30 through the PN junction.

In an embodiment, the second selection circuit 20 includes a third unidirectional circuit 21, and a fourth unidirectional circuit 22.

A first end of the third unidirectional circuit 21 is connected to the first pixel electrode S1, and a second end of the third unidirectional circuit 21 is connected to the input end of the reset circuit 30.

A first end of the fourth unidirectional circuit 22 is connected to the second pixel electrode S2, and a second end of the fourth unidirectional circuit 22 is connected to the input end of the reset circuit 30.

When the reset circuit 30 is conducted, both the first unidirectional circuit 11 and the second unidirectional circuit 12 are conducted, and the conducting current direction of the third unidirectional circuit 21 is the same as the conducting current direction of the first unidirectional circuit 21, and a conducting current direction of the fourth unidirectional circuit 11 is the same as the conducting current direction of the second unidirectional circuit 12.

The third unidirectional circuit 21 and the fourth unidirectional circuit 22 may be realized by adopting a PN junction, the third unidirectional circuit 21 may include a third PN junction PN3, and the fourth unidirectional circuit 22 may include a fourth PN junction PN4. Similarly, the second selection circuit 20 may further include two circuit structures according to the different connection of the positive and negative poles of the PN junction, which is specifically as follows.

The first circuit structure of the second selection circuit 20 is: as specifically shown in FIG. 3, the first end of the third unidirectional circuit 21 is the positive pole of the third PN junction PN3, and the second end may be the negative pole of the third PN junction PN3, the first end of the fourth unidirectional circuit 22 is the negative pole of the fourth PN junction PN4, and the second end may be the positive pole of the fourth PN junction PN4. At this time, the first selection circuit 10 may further be the first circuit structure, that is, the conducting current directions of the first unidirectional circuit 11 and the third unidirectional circuit 21 at this time are both from the first end to the second end, that is, the conducting current directions of the second unidirectional circuit 12 and the fourth unidirectional circuit 22 at this time are both from the second end to the first end. In this way, the writing function of the first selection circuit 10 and the reset function of the second selection circuit 20 may be independent from each other, and both the first election circuit 10 and the second election circuit 20 adopt the first circuit structure.

The second circuit structure of the second selection circuit 20 is: as specifically shown in FIG. 4, the first end of the third unidirectional circuit 21 is the negative pole of the third PN junction PN3, and the second end may be the positive pole of the third PN junction PN3, the first end of the fourth unidirectional circuit 22 is the positive pole of the fourth PN junction PN4, and the second end may be the negative pole of the fourth PN junction PN4. At this time, the first selection circuit 10 may further be a second circuit structure, that is, the conducting current directions of the first unidirectional circuit 11 and the third unidirectional circuit 21 at this time are both from the second end to the first end, that is, the conducting current directions of the second unidirectional circuit 12 and the fourth unidirectional circuit 22 at this time are both from the first end to the second end, so that the writing function of the first selection circuit 10 and the reset function of the second selection circuit 20 may be independent from each other, and both the first election circuit 10 and the second election circuit 20 adopt the second circuit structure.

However, when the data signal is written, the third unidirectional circuit 21 will make the electric potential at the first end greater than the electric potential at the second end under the action of the first pixel PXL1. The fourth unidirectional circuit 22 will make the electric potential at the first end less than the electric potential at the second end under the action of the second pixel PXL2, so that the third unidirectional circuit 21 is conducted with the fourth unidirectional circuit 22, thereby making the fourth thin film transistor T4 and the fifth thin film transistor T5 generate the leakage current to affect the electric potentials of the first pixel PXL1 and the second pixel PXL2.

To solve this problem, the present application is provided with a second thin film transistor T2 and a third thin film transistor T3, the controlled end of the second thin film transistor T2 is connected to the scan line L1, and the input end of the second thin film transistor T2 is configured to access the first preset electric potential DC2 is connected, and the output end of the second thin film transistor T2 is connected to the second end of the third unidirectional circuit 21. The controlled end of the third thin film transistor T3 is connected to the scan line L1, the input end of the third thin film transistor T3 is configured to access the second preset electric potential DC3, and the output end of the third thin film transistor T3 is connected to the second end of the fourth unidirectional circuit 22.

The input end of the second thin film transistor T2 may be connected to the second electric potential line L4, and the second electric potential line L4 is configured to access and transmit the first preset electric potential DC2, which may be the maximum electric potential value in the data signal (with respect to the common electrode) of the positive-polarity signal. The input end of the third thin film transistor T3 may be connected to the third potential line L5, and the third potential line L5 is configured to access and transmit the two preset electric potentials DC3, and the second preset electric potential DC3 may be the minimum electric potential value in the data signal (relative to the common electrode) of the negative-polarity signal. In this way, when the data signal is written in the first pixel PXL1 and the second pixel PXL2, that is, when the high electric potential scanning signal G(N) is transmitted on the current row scan line L1, the second thin film transistor T2 and the third thin film transistor T3 are conducted to pull up the electric potential of the second end of the third unidirectional circuit 21 to the first preset electric potential DC2, and to pull up the electric potential of the second end of the fourth unidirectional circuit 22 to the second preset electric potential DC3, so that electric potential at the first end of the third unidirectional circuit 21 may not be greater than the electric potential at the second end thereof. The potential at the first end of the fourth unidirectional circuit 22 may not be less than the potential at the second end thereof, so that the third unidirectional circuit 21 and the fourth unidirectional circuit 22 turn off, so as to prevent the electric potentials of the first pixel PXL1 and the second pixel PXL2 from being affected by the leakage current of the fourth thin film transistor T4 and the fifth thin film transistor T5.

Besides, the second to fifth thin film transistors (T2 to T5) and the first to third electric potential lines (L3 to L5) may be provided in the non-effective display area of the liquid crystal display device, so as to avoid the decrease in the aperture ratio caused by providing in the effective display area, which is conducive to further improving the display brightness.

Second Embodiment

The present application further provides a method for controlling the pixel, which is configured to control the above-mentioned pixel circuit, the specific structure of which is referred to the above first embodiment. Since the method for controlling the pixel adopts all the technical solutions of the above first embodiment, it has at least all the beneficial effects brought about by the technical solutions of the above first embodiment, which will not be repeated herein.

The display device may also include a timing controller, a source electrode driving circuit, and a grid electrode driving circuit, wherein the timing controller may be the executor of the method of the present application; the source electrode driving circuit may be connected to the timing controller and a plurality of data lines L2 to output the data signal of the corresponding electric potential to each data line L2 under the control of the timing controller. The grid electrode driving circuit may be connected to the timing controller and the plurality of the scan lines L1 to output scan signals with corresponding electric potentials to each scan line L1 row by row, so as to realize the turn-on of the scan lines L1 row by row.

Figure 5:
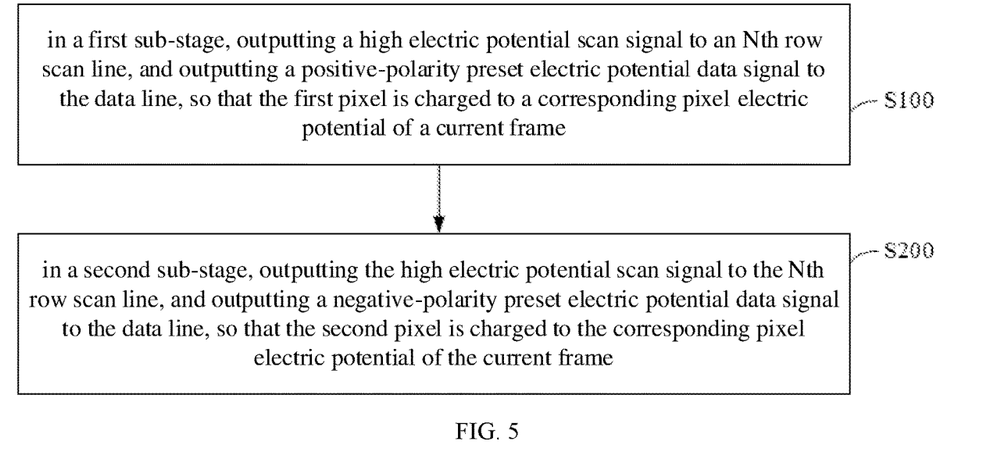
FIG. 5 is a schematic flowchart of a method for controlling pixel according to a second embodiment of the present application.
Figure 6:
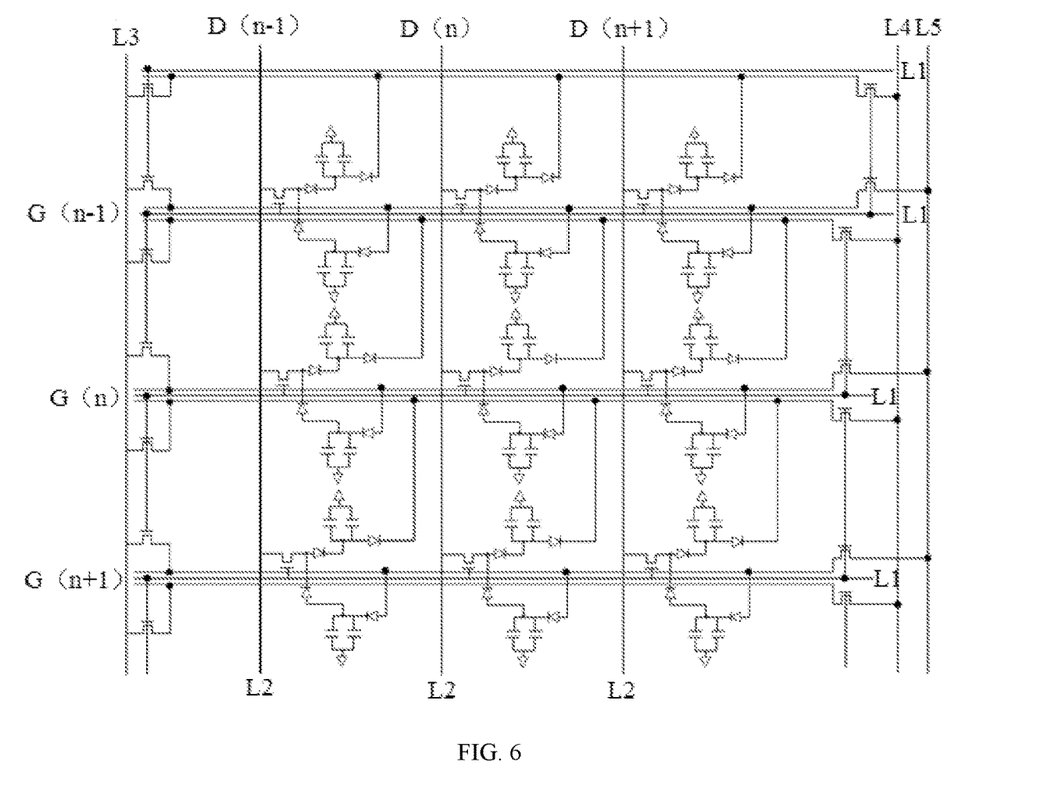
FIG. 6 is a schematic distribution diagram of the pixel circuit in an effective display area according to the first embodiment of the present application.

As shown in FIG. 5 to FIG. 8, in the second embodiment, in the frame display period in which the timing controller controls the effective display area to display a frame of picture, the frame display period may be divided into a control stage and a non-control stage for the first pixel PXL1 and the second pixel PXL2. The control stage may include a first sub-stage and a second sub-stage executed in sequence. The method for controlling the pixel includes:

Operation S100, in the first sub-stage T1, outputting a high electric potential scan signal to the Nth row scan line L1, and outputting a positive-polarity preset electric potential data signal to the data line L2, so that the first pixel PXL1 is charged to a corresponding pixel electric potential of a current frame.

Specifically, the timing controller controls the gate drive circuit to output a high electric potential scan signal G(n) to the scan line L1 of the Nth row to control the scan line L1 of the Nth row to turn on, and controls the source electrode driving circuit to output a positive-polarity preset electric potential of the data signal to the data line L2, so as to write the data signal of the positive-polarity preset electric potential to the first pixel PXL1 connected to the pixel circuit through the pixel circuit connected to the scan line L1 and the data line L2 of the Nth row, so that the first pixel PXL1 may be charged to the corresponding pixel electric potential of the current frame.

Operation S200, in the second sub-stage T2, outputting the high electric potential scan signal G(n) to the Nth row scan line L1, and outputting a negative-polarity preset electric potential data signal to the data line L2, so that the second pixel PXL2 is charged to the corresponding pixel electric potential of the current frame.

Specifically, the timing controller controls the grid electrode driving circuit to output a high electric potential scan signal G(n) to the Nth row scan line L1 to control the Nth row scan line L1 to turn on, and controls the source electrode driving circuit to output a data signal of the negative-polarity preset electric potential to the data line L2 to write the data signal of the negative-polarity preset electric potential to the second pixel PXL2 connected to the pixel circuit through the pixel circuit connected to the scan line L1 and the data line L2 of the Nth row, so that the second pixel PXL2 may be charged to the corresponding pixel electric potential of the current frame.

In the non-control stage other than the control stage, the timing controller may output a low electric potential scan signal G(n) to control the Nth scan line L1 to be turned off. In the embodiment shown in FIG. 8, the controlled end of the reset circuit 30 in the pixel circuit is connected to the scan line of the previous row, so when the scan line of the previous row is connected to the high electric potential scan signal G(n−1), the electric potential of the first pixel PXL1 and the second pixel PXL2 are reset to a preset reset electric potential DC1.

It should be noted that, the positive-polarity preset electric potential and the negative-polarity preset electric potential described in this application are compared with the preset reset electric potential DC1, the positive-polarity preset electric potential is higher than the preset reset electric potential DC1, and the negative-polarity preset electric potential is higher than the preset reset electric potential DC1, while the negative-polarity preset electric potential is lower than the preset reset electric potential DC1. Besides, the positive-polarity preset electric potential may be correspondingly determined through the pixel electric potential required by the first pixel PXL1 when displaying the current frame, and the negative-polarity preset electric potential may be correspondingly determined through the pixel electric potential required by the second pixel PXL2 when displaying the current frame, which are not limited here.

Since both the first selection circuit 10 and the second selection circuit 20 of the present application have two circuit structures, the pixel circuit of the present application may also have two circuit structures, which is specifically as follows: the pixel circuit with the first circuit structure may include the first selection circuit 10 and the second selection circuit 20 respectively adopting the first circuit structure, which is specifically shown in FIG. 3; the pixel circuit with the second circuit structure may include the first selection circuit 10 and the second selection circuit 20 respectively adopting the second circuit structure, which is specifically shown in FIG. 4.

Based on the circuit structures of the above two pixel circuits, the effective display area of the display device of the present application may also have two pixel circuit settings, which is specifically as follows.

Figure 7:
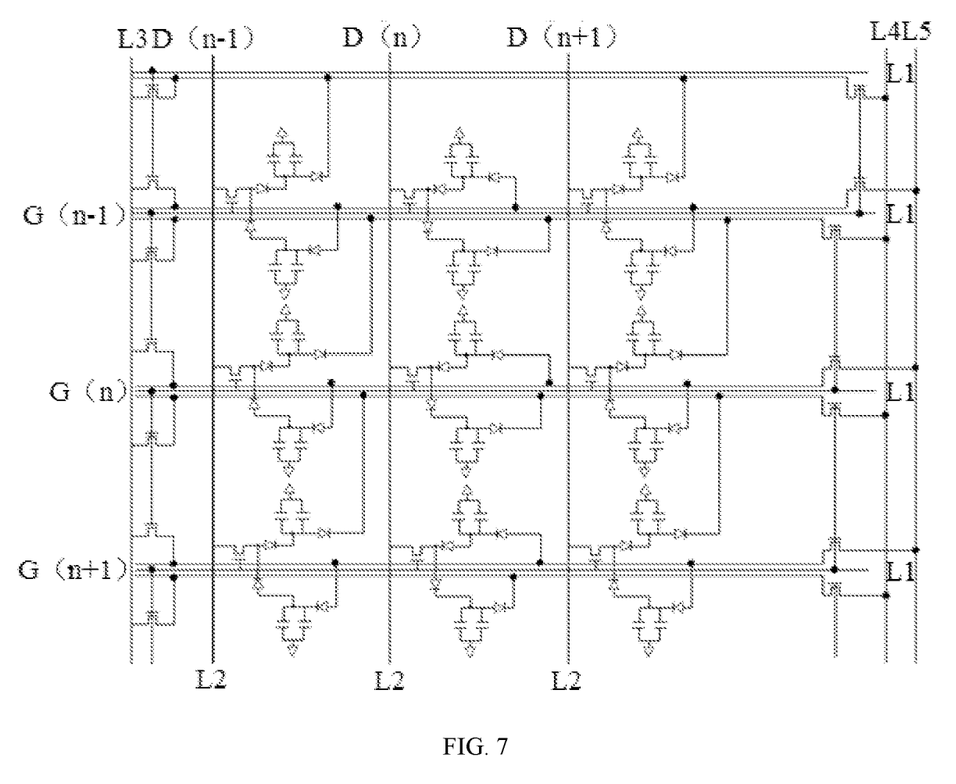
FIG. 7 is another schematic distribution diagram of the pixel circuit in the effective display area according to the first embodiment of the present application.

The first setting method is that the circuit structure of any pixel circuit in the effective display area is the same, as specifically shown in FIG. 7, at this time, the pixel circuit may adopt the first circuit structure. In other words, any pixel circuit at this time the conducting current directions of the first unidirectional circuit 11, the second unidirectional circuit 12, the third unidirectional circuit 21, and the fourth unidirectional circuit 22 are respectively the same as the first unidirectional circuit 11, the second unidirectional circuit 12, the third unidirectional circuit 21, and the fourth unidirectional circuit 22 in another pixel circuit adjacent to the same row. The timing controller may plan the polarity combination of each pixel in the effective display area by controlling the polarities of the data signals transmitted on any two adjacent data lines L2 to be opposite, so that the polarities of the two adjacent pixels are different, thereby realizing row inversion control for each pixel in the effective display area.

Figure 8:
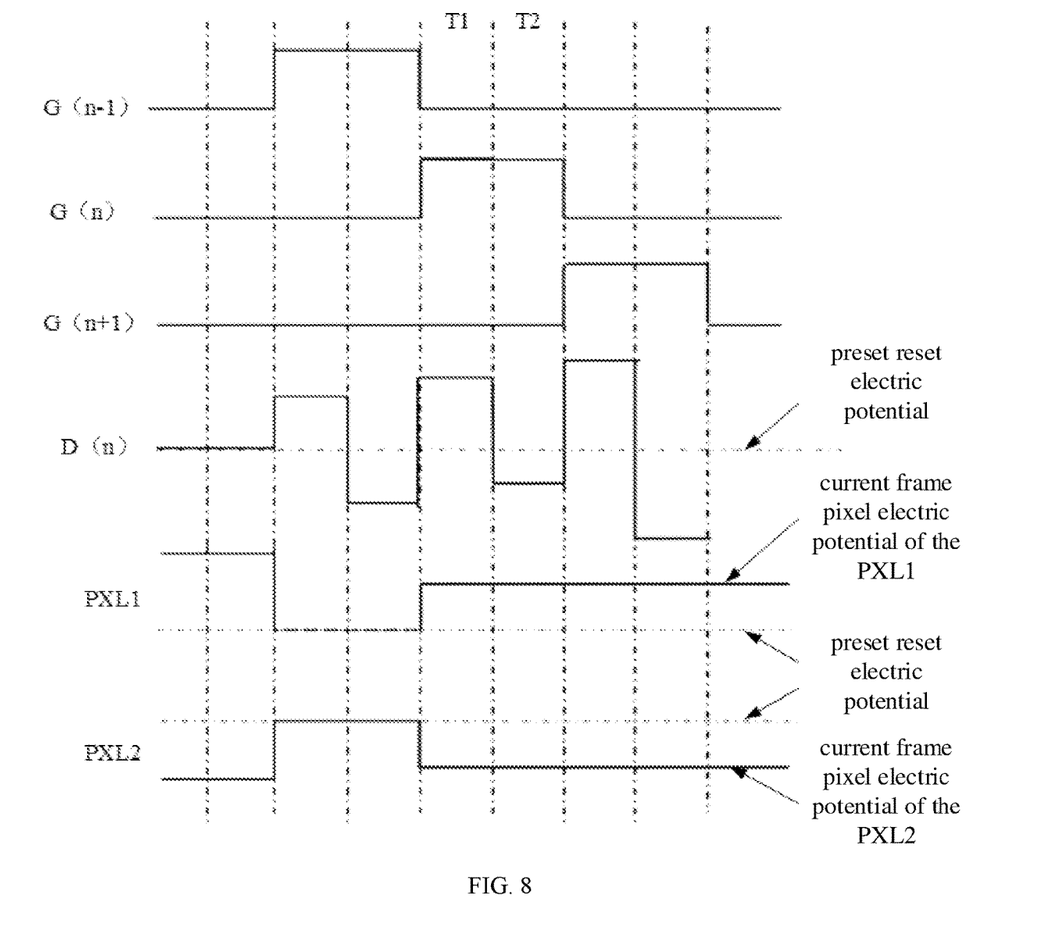
FIG. 8 is a schematic diagram of a timing of the pixel circuit according to the first embodiment of the present application.

The second setting method is that any two adjacent pixel circuits on the same row in the effective display area are different, as specifically shown in FIG. 8, but any two adjacent pixel circuits on the same column are the same. At this time, the pixel circuits with two circuit structures are provided in the effective display area, in other words, at this time, the conducting current directions of the first unidirectional circuit 11, the second unidirectional circuit 12, the third unidirectional circuit 21, and the fourth unidirectional circuit 22 in any pixel circuit are respectively opposite to the first unidirectional circuit 11, the second unidirectional circuit 12, the third unidirectional circuit 21, and the fourth unidirectional circuit 22 in another pixel circuit adjacent to the same row. The timing controller may plan the polarity combination of each pixel in the effective display area by controlling the polarities of the data signals transmitted on any two adjacent data lines L2 to be the same, so as to realize the dot inversion control of each pixel in the effective display area, and due to the unidirectional conductivity of the PN junction, the polarity between the pixel electrodes may be changed by correspondingly changing the polarity of the common electrodes at the same time.

Third Embodiment

The present application further provides a display device, which includes a scan line L1, a data line L2, a first pixel PXL1, a second pixel PXL2, and a pixel circuit, the specific structure of which is referred to the above embodiments. Since the display device adopts all the technical solutions of the above embodiments, it has at least all the beneficial effects brought about by the technical solutions of the above embodiments, which will not be repeated herein.

The first pixel PXL1 and the second pixel PXL2 are located on opposite sides of the scan line L1, the first pixel PXL1 includes a first pixel electrode S1, and the second pixel PXL2 includes a second pixel electrode S2, the pixel circuits are respectively connected to the scan line L1, the data line L2, the first pixel electrode S1 and the second pixel electrode S2. The display device may further include a timing controller, and the timing controller may control the pixel circuit to drive the first pixel PXL1 and the second pixel PXL2 to work according to the above-mentioned method for controlling the pixel, so as to realize the display of the current frame.

The above are only some embodiments of the present application, not to limit the scope of the present application. Any equivalent structural transformation made by using the content of the specification of the present application and the drawings under the inventive concept of the present application, or direct/indirect application in other related technical fields are included in the scope of the present application.

What is claimed is:

1. A pixel circuit, applied to a display panel, the display panel comprising: a scan line, a data line, a first pixel, and a second pixel, the first pixel comprising a first pixel electrode, and the second pixel comprising a second pixel electrode, wherein the pixel circuit comprises:
a first thin film transistor, wherein a controlled end of the first thin film transistor is connected to the scan line, and an input end of the first thin film transistor is connected to the data line; and
a first selection circuit, wherein an input end of the first selection circuit is connected to an output end of the first thin film transistor, the first output end of the first selection circuit is connected to the first pixel electrode, and a second output end of the first selection circuit is connected to the second pixel electrode,
wherein the first thin film transistor is configured to sequentially write a data signal transmitted on the data line into the first pixel and the second pixel through the first selection circuit according to a scanning signal transmitted on the scan line, to charge the first pixel and the second pixel sequentially, so that the first pixel and the second pixel are sequentially charged to a corresponding pixel electric potential of a current frame;
wherein the first selection circuit comprises:
a first unidirectional circuit, wherein a first end of the first unidirectional circuit is connected to the output end of the first thin film transistor, and a second end of the first unidirectional circuit is connected to the first pixel electrode; and
a second unidirectional circuit, wherein a first end of the second unidirectional circuit is connected to the output end of the first thin film transistor, and a second end of the second unidirectional circuit is connected to the second pixel electrode,
wherein in response to that the first thin film transistor outputs a data signal, one of the first unidirectional circuit or the second unidirectional circuit is conducted, the other of the first unidirectional circuit or the second unidirectional circuit is turned off, and a conducting current direction of the first unidirectional circuit is opposite to a conducting current direction of the second unidirectional circuit;
wherein the pixel circuit comprises a reset circuit,
a controlled end of the reset circuit is connected to a previous preset row scan line, an input end of the reset circuit is configured to access a preset reset electric potential, a first output end of the reset circuit is connected to the first pixel electrode, and a second output end of the reset circuit is connected to the second pixel electrode, and
the reset circuit is configured to output the preset reset electric potential to the first pixel electrode and the second pixel electrode according to a scan signal transmitted on the previous preset row scan line, so as to reset the first pixel and the second pixel;

wherein the pixel circuit further comprises a second selection circuit, wherein a first input end of the second selection circuit is connected to the first output end of the reset circuit, a second input end of the second selection circuit is connected to the second output end of the reset circuit, a first output end of the second selection circuit is connected to the first pixel electrode, and a second output end of the second selection circuit is connected to the second pixel electrode;

wherein the second selection circuit comprises:

a third unidirectional circuit, wherein a first end of the third unidirectional circuit is connected to the first pixel electrode, and a second end of the third unidirectional circuit is connected to the first output end of the reset circuit; and a fourth unidirectional circuit, wherein a first end of the fourth unidirectional circuit is connected to the second pixel electrode, and a second end of the fourth unidirectional circuit is connected to the second output end of the reset circuit, wherein in response to that the reset circuit is conducted, both the first unidirectional circuit and the second unidirectional circuit are conducted, and a conducting current direction of the third unidirectional circuit is the same as the conducting current direction of the first unidirectional circuit, and a conducting current direction of the fourth unidirectional circuit is the same as the conducting current direction of the second unidirectional circuit.

2. The pixel circuit of claim 1, further comprising:

a second thin film transistor, wherein a controlled end of the second thin film transistor is connected to the scan line, an input end of the second thin film transistor is configured to access the first preset electric potential, and an output end of the second thin film transistor is connected to the second end of the third unidirectional circuit; and a third thin film transistor, wherein a controlled end of the third thin film transistor is connected to the scan line, an input end of the third thin film transistor is configured to access the second preset electric potential, and an output end of the third thin film transistor is connected to the second end of the fourth unidirectional circuit.

3. The pixel circuit of claim 1, wherein the first unidirectional circuit, the second unidirectional circuit, the third unidirectional circuit, and the fourth unidirectional circuit comprise PN junctions.

4. A method for controlling a pixel, applied to the pixel circuit of claim 1, comprising:

in a first sub-stage, outputting a high electric potential scan signal to an Nth row scan line, and outputting a positive-polarity preset electric potential data signal to the data line, so that the first pixel is charged to a corresponding pixel electric potential of a current frame;

in a second sub-stage, outputting the high electric potential scan signal to the Nth row scan line, and outputting a negative-polarity preset electric potential data signal to the data line, so that the second pixel is charged to the corresponding pixel electric potential of the current frame; and in response to that conducting current directions of a first unidirectional circuit, a second unidirectional circuit, a third unidirectional circuit, and a fourth unidirectional circuit in two adjacent pixel circuits of a same row are the same, controlling a polarity of data signals transmitted on any two adjacent data lines to be opposite; or in response to that the conducting current directions of the first unidirectional circuit, the second unidirectional circuit, the third unidirectional circuit, and the fourth unidirectional circuit in two adjacent pixel circuits of a same row are opposite, controlling a polarity of the data signals transmitted on any two adjacent data lines to be same.

5. A display device, comprising:

the pixel circuit of claim 1, wherein the pixel circuit is respectively connected to the scan line, the data line, the first pixel electrode and the second pixel electrode, and the display device is configured to control the first pixel and the second pixel to work.

* * * * *